United States Patent
Everingham et al.

[11] Patent Number: 5,960,776
[45] Date of Patent: Oct. 5, 1999

[54] EXHAUST GAS RECIRCULATION VALVE HAVING A CENTERED SOLENOID ASSEMBLY AND FLOATING VALVE MECHANISM

[75] Inventors: Gary Everingham; Kenneth P. Nydam, both of Chatham, Canada

[73] Assignee: Siemens Canada Limited, Mississisauga, Canada

[21] Appl. No.: 08/943,941

[22] Filed: Oct. 3, 1997

Related U.S. Application Data

[60] Continuation-in-part of application No. 08/909,134, Aug. 11, 1997, which is a division of application No. 08/754,572, Nov. 21, 1996, Pat. No. 5,669,364.

[51] Int. Cl.⁶ .......................... F02M 25/07; F16K 31/06
[52] U.S. Cl. ................ 123/568.26; 251/129.18
[58] Field of Search ................ 123/568.26; 251/129.15, 251/129.18; 335/219, 255–258

[56] References Cited

U.S. PATENT DOCUMENTS

| | | | |
|---|---|---|---|
| Re. 32,783 | 11/1988 | Clark | 335/261 |
| Re. 32,860 | 2/1989 | Clark | 335/261 |
| 2,291,599 | 8/1942 | Ray | 335/255 |
| 2,735,047 | 2/1956 | Garner et al. | 251/245 |
| 3,134,933 | 5/1964 | Brand et al. | 335/281 |
| 3,510,814 | 5/1970 | Nordfors | 335/262 |
| 4,046,351 | 9/1977 | Lang | 251/129.17 |
| 4,312,494 | 1/1982 | Aoyama | 251/48 |
| 4,443,775 | 4/1984 | Fujitani et al. | 335/251 |
| 4,515,343 | 5/1985 | Pischinger et al. | 251/48 |
| 4,538,569 | 9/1985 | Sugino et al. | 123/316 |
| 4,556,085 | 12/1985 | Warrick | 137/625.65 |
| 4,578,662 | 3/1986 | Slavin et al. | 335/262 |
| 4,651,118 | 3/1987 | Zeuner et al. | 335/258 |
| 4,682,574 | 7/1987 | Kreuter | 123/90.11 |
| 5,006,901 | 4/1991 | Dick | 335/258 |
| 5,094,218 | 3/1992 | Everingham et al. | 123/568.26 |
| 5,252,939 | 10/1993 | Riefler et al. | 335/280 |
| 5,460,146 | 10/1995 | Frankenberg | 123/571 |
| 5,467,962 | 11/1995 | Bircann et al. | 340/870.17 |
| 5,494,255 | 2/1996 | Pearson et al. | 251/129.15 |
| 5,571,248 | 11/1996 | Seetharaman et al. | 137/625.65 |
| 5,626,165 | 5/1997 | Shinobu | 137/556 |

FOREIGN PATENT DOCUMENTS

| | | |
|---|---|---|
| 62-40708 | 8/1987 | Japan . |
| 6249083 | 6/1994 | Japan . |

OTHER PUBLICATIONS

Patent Abstracts of Japan, JP6249032, Jun. 9, 1994.

*Primary Examiner*—Tony M. Argenbright
*Assistant Examiner*—Arnold Castro

[57] ABSTRACT

A valve assembly for introducing exhaust gas into the intake manifold of an internal combustion engine, preferably, an electric exhaust gas recirculation valve assembly. The valve assembly includes an actuator having a centered solenoid assembly that reciprocates a floating valve mechanism to provide a substantially constant flow rate of exhaust gas regardless of the reciprocating direction of the floating valve mechanism. That is, the valve assembly delivers a gas flow rate that is substantially free of hysteresis because the valve assembly provide substantially the same exhaust gas flow rate for a given percentage of a pulse width modulated duty cycle when the floating valve mechanism is reciprocating in a valve opening direction or a valve closing direction.

33 Claims, 4 Drawing Sheets

EXHAUST GAS RECIRCULATION VALVE HAVING A CENTERED SOLENOID ASSEMBLY AND FLOATING VALVE MECHANISM

CROSS REFERENCE TO RELATED APPLICATIONS

This application is a Continuation-In-Part of U.S. application Ser. No. 08/909,134 (Attorney Docket No. 96 P 7686 US 01), filed Aug. 11, 1997, which is a Divisional Application, under 37 CFR §1.60, of U.S. application Ser. No. 08/754,572 (Attorney Docket No. 96 P 7686 US), filed Nov. 21, 1996, which is now U.S. Pat. No. 5,669,364.

BACKGROUND OF THE INVENTION

This invention concerns installations for exhaust gas recirculation (EGR) valves. EGR valves are used to control the introduction of exhaust gas into the intake manifold of an internal combustion engine in order to reduce engine emissions by lowering peak combustion temperatures in the engine cylinders.

SUMMARY OF THE INVENTION

The present invention provides a valve assembly for introducing exhaust gas into the intake manifold of an internal combustion engine. Preferably, the valve assembly comprises an electric exhaust gas recirculation valve assembly. The valve assembly includes an actuator that reciprocates a floating valve mechanism to provide a substantially constant flow rate of exhaust gas regardless of the reciprocating direction of the floating valve mechanism. That is, the valve assembly of the present invention provides substantially the same exhaust gas flow rate for a given percentage of a pulse width modulated (PWM) duty cycle when the floating valve mechanism is reciprocating in a valve opening direction or a valve closing direction. Accordingly, the present invention provides a valve assembly that delivers a gas flow rate that is substantially free of hysteresis.

The actuator of the valve assembly is disposed within a housing. The actuator preferably comprises a solenoid assembly. The solenoid assembly includes an armature that moves within a sleeve upon energization of a coil. The sleeve has a guiding surface that guides the armature. The sleeve is surrounded by a stator assembly.

The stator assembly of the present invention includes an operative surface. The operative surface of the stator assembly is disposed at a fixed distance from the guiding surface to define a gap between the guiding surface of the sleeve and the operative surface of the stator assembly. The gap between the guiding surface and the operative surface establishes a constant centered sleeve within a central bore of the stator assembly.

By providing a centered sleeve within the central bore of the stator assembly, radial forces that act on the armature during energization of the coil are reduced when compared to the radial forces acting on an armature in a non-centered sleeve. The radial forces are reduced because the radial forces are radially balanced. The reduced radial forces acting on the armature in the centered sleeve of the present invention also reduces friction between the moving armature and the guiding surface. Accordingly, the centered sleeve of the present invention that reduces radial forces acting on the armature and that reduces the friction between the armature and the guiding surface of the sleeve, provides an arrangement that improves centering of the armature within the magnetic field generated by the solenoid assembly. Thus, the present invention provides an actuator with a centered solenoid assembly.

The floating valve mechanism of the present invention is, preferably, an axial floating valve mechanism that includes an operating rod with a valve element configured to engage a valve seat. The operating rod extends toward the actuator and engages the armature to form a single load operative connection between the actuator and the floating valve mechanism. In addition to the valve element, the operating rod, preferably, has a rod head.

The floating valve mechanism further includes a biasing member that forces the rod head and armature into operative engagement. The biasing member, preferably, comprises a spring that engages a spring retainer snap fitted into a groove in the operating rod proximate the rod head. The spring retainer has an annular lip that engages the spring so that the armature is free to slide on a crown of the rod head. By being able to slide on the crown of the rod head and provide the single load operative connection between the actuator and the floating valve mechanism, the armature does not bind in the sleeve during reciprocal movement. Thus, the armature is free to pivot relative to the floating valve mechanism virtually without constraint.

The stator assembly of the present invention, preferably, comprises an upper stator and a lower stator. The upper and lower stators are fixed within the housing by a plurality of projections that form landing pads that support the upper and lower stators. The housing, preferably, comprises a shell with projections formed by lancing a portion of the shell toward an interior portion of the shell. The use of the landed projections to form the landing pads provides a self alignment feature for the stator with in the shell.

The armature is movable within the central bores of upper stator and lower stators. One of the stators has a rim of tapered thickness to create a flux pattern which allows the progressive positioning of an armature that reciprocates the floating valve mechanism. The armature stabilizes in various successive positions corresponding to the voltage, percent of the PWM duty cycle, applied to the coil.

The present invention also provides that at least one of the upper stator and the lower stator comprises a central bore having the operative surface and at least one protrusion extending from the operative surface toward a central axis of the bore. The upper stator, preferably, comprises an undercut surface, which serves as the operative surface, and two projections spaced along the central axis of the bore. Each of the projections has a flat annular surface that engages the sleeve.

The armature of the present invention, preferably, includes a central passage with a transverse wall. A replaceable plug is mounted in the transverse wall. In the preferred embodiment of the invention, the rod head of the operating rod contacts only the replaceable plug. The replaceable plug can be readily change to different sizes to calibrate the valve assembly, particularly, the single load operative connection between the actuator and the floating valve mechanism.

In a preferred embodiment of the invention, the spring of the floating valve mechanism urges the valve element towards a closed position on the valve seat, while a second weaker spring urges the valve element towards an open position. The magnetic field generated by the centered solenoid assembly moves the armature with sufficient force to lift the valve element from the valve seat against the spring forces, the manifold vacuum, and exhaust pressure forces tending to close the valve. An equilibrium condition is reached between the increasing resistance of the spring forces and the electrical generated magnetic force as successive progressively further opened positions are achieved with increasing percentages of the PWM signal applied to the coil of the centered solenoid assembly.

The present invention also provides a position sensor mounted to the housing, which is operatively coupled to the operating rod through a plunger that is urged into operative engagement with the plug within transverse wall of the armature by the second spring. The position sensor produces a signal corresponding to a position of the valve element of the operating rod. The signal is a feedback signal that corresponds to the movement of the valve element to allow precise control over the extent of opening movement of the floating valve mechanism by signals from an engine controller.

The present invention also includes a method of delivering a quality of gas flow substantially free of operational hysteresis is an electric exhaust recirculation valve. The method comprises the steps of providing an armature that moves within a sleeve upon energization of a coil; surrounding the sleeve with a stator assembly so that an operative surface of the stator assembly is a fixed distance from the sleeve; and biasing the head of an operating rod into engagement with the armature.

DESCRIPTION OF THE DRAWINGS

The accompanying drawings, which are incorporated herein and constitute part of this specification, illustrate a presently preferred embodiment of the invention, and, together with a general description given above and a detailed description of the preferred embodiment given below, serve to explain the principles of the invention.

DETAILED DESCRIPTION

Figure 1:
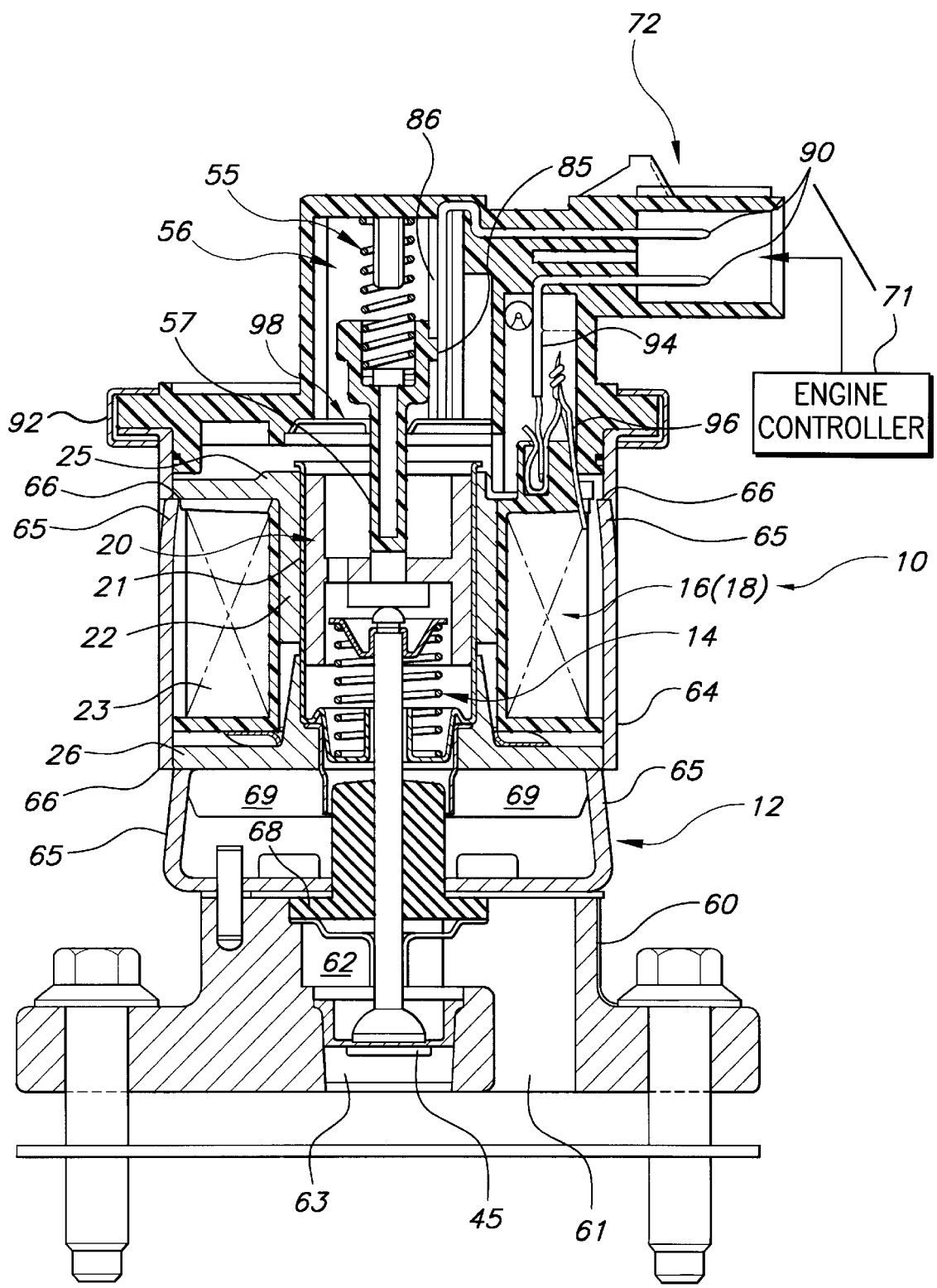
FIG. 1 is a sectional view taken through a valve assembly, preferably, an electric exhaust gas recirculation (EEGR) valve, according to the present invention.

FIG. 1, illustrates an electric exhaust gas recirculation (EEGR) valve 10 for an internal combustion engine (not shown). The EEGR valve 10 includes a housing 12, a floating valve mechanism 14 disposed within the housing 12, and an actuator 16 that operates the floating valve mechanism 14 to control the flow of exhaust gas through the housing 12.

The actuator 16, preferably, is a centered solenoid assembly 18 having a stator assembly 20, sleeve 21, armature 22, and a coil 23. The sleeve 21 is surround by the stator assembly 20. The armature 22 reciprocates within the sleeve 21 upon energization of the coil 23. The stator assembly 20 is disposed proximate and in surrounding relationship to the sleeve 21. The coil 23 is disposed proximate and in surrounding relationship to the stator assembly 20.

The stator assembly 20 has an operative surface 24. In the preferred embodiment, the stator assembly 20 includes an upper stator 25 and a lower stator 26. The upper and lower stators 25, 26 are annular ferromagnetic structures. Each of the upper stator 25 and the lower stator 26 has a central bore 27 and 28. At least one of the central bores 27 or 28 includes the operative surface 24 and at least one projection 29 or 30 extending from the operative surface 24 toward a central axis 31 or 32 of the central bore 27 or 28, respectively.

Figure 2:
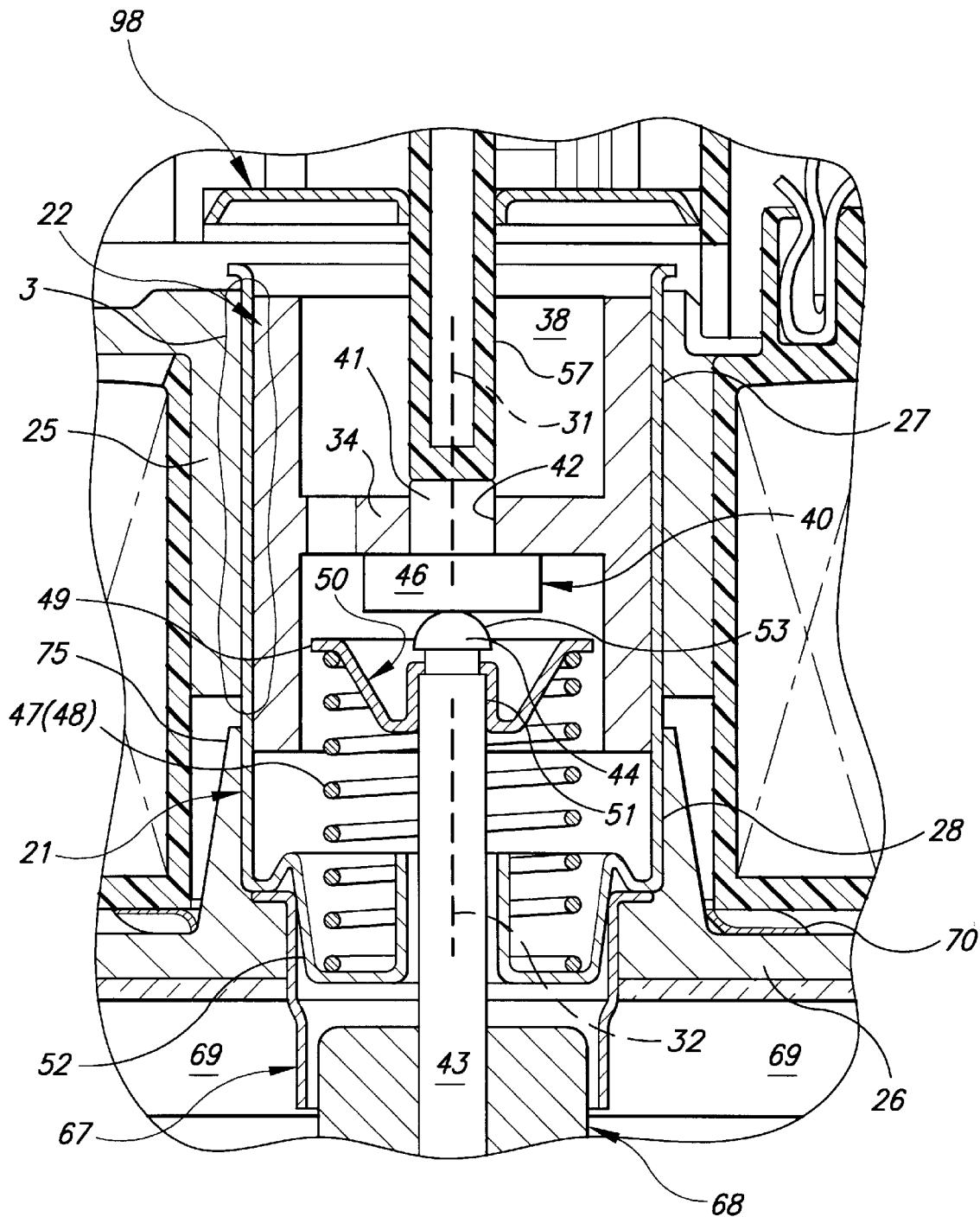
FIG. 2 is an enlarged fragmentary sectional view of an upper portion of the EEGR valve shown in FIG. 1.
Figure 3:
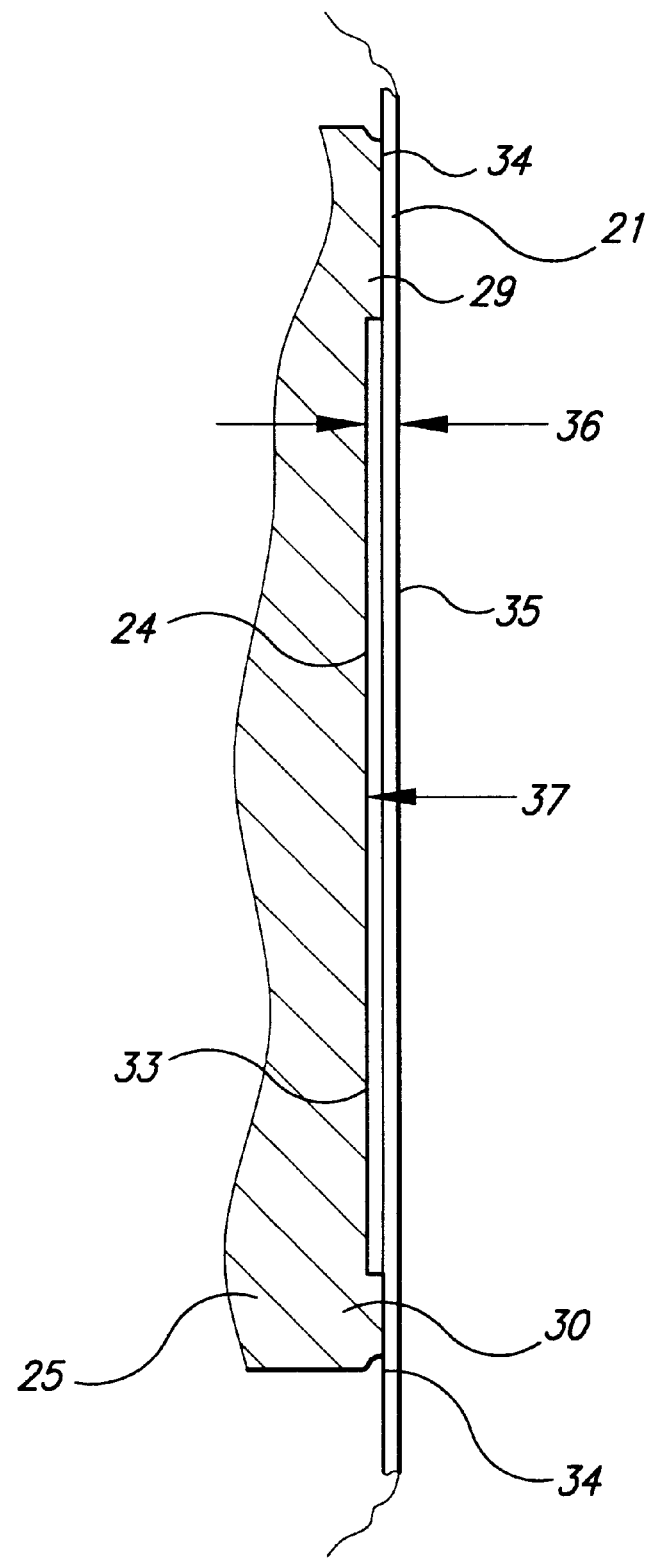
FIG. 3 is an enlarged fragmentary sectional view of the encircled portion of the upper portion of EEGR valve shown in FIG. 2.

As shown in FIGS. 1–3, particularly FIG. 3, the upper stator 25 includes the operative surface 24. The operative surface 24 is an undercut surface 33 formed along the central bore 27 so that two projections 29, 30 (which are spaced along the central axis 31 of the central bore 27) extend from the operative surface 24 toward the central axis 31 of the central bore 27. Each of the two projections 29, 30 has a flat annular surface 34 that engages the sleeve 21. The two projections 29, 30 of the upper stator 25 along with the lower stator 28 support the sleeve 21 within the centered solenoid assembly 18.

As shown in FIG. 3, the sleeve 21 has an armature guiding surface 35 disposed a fixed distance 36 from the operative surface 24 of the stator assembly 20 to define a gap 37 between the armature guiding surface 35 of the sleeve 21 and the operative surface 24 of the stator assembly 20. The fixed distance 36 is established due to the two projections 29, 30 of the upper stator 25 supporting the sleeve 21.

The fixed distance 36 between the operative surface 24 of the upper stator 25 and the armature guiding surface 35 of the sleeve 21 can be establish by other arrangements so long as the gap 37 is defined between the operative surface 24 and the armature guiding surface 35.

The armature 22 is movable within the central bores 27, 28 of the upper stator 25 and of the lower stator 26. The armature 22 includes a central passage 38 with a transverse wall 39. A replaceable plug 40 is mounted in the transverse wall 39. The replaceable plug 40 has a stem 41 press fit into a bore 42 of the transverse wall 39 of the armature 22. A properly sized plug can be installed to achieve a desired valve 10 opening at a specified coil 23 energization level. Thus, the replaceable plug 40 provides a calibration device for the EEGR valve 10.

The armature 22 is ferromagnetic and is, preferably, a monolithic one-piece structure. The transverse wall 39 is, preferably, formed by creating two separate axially aligned holes in the monolithic structure. The one-piece structure, however, could as be formed by integral mounting parts of the armature together, i.e., the transverse wall 39 could be a separate piece press fit into the central passage 38.

The floating valve mechanism 14 operatively engages the centered solenoid assembly 18. The floating valve mechanism 14 includes an operating rod 43. The operating rod 43, has a rod head 44 and a valve element 45. The operating rod 43 extends toward the centered solenoid assembly 18 so that the rod head 43 engages the armature 22 to form a single load operative connection 46 between the centered solenoid assembly 18 and the floating valve assembly 14.

A biasing member forces 47 the rod head 44 and armature 22 into operative engagement. The biasing member 47 is, preferably, a compression spring 48 of the floating valve mechanism 14 that forces the rod head 44 of operating rod 43 into engagement with the armature 22. The compression spring 48 engages an annular lip 49 of a spring retainer 50 disposed on the operating rod 43 proximate the rod head 44. The spring retainer 50 is snap fitted into a groove 51 in the operating rod 43 proximate the rod head 44. The compression spring 48 is confined between a radially inward cup 52 of the sleeve 21 and the spring retainer 50. The radially inward cup 52 and the spring retainer 50 provided a reaction structure for the compression spring 48. The compression spring 48 engages the spring retainer 50 so that the replaceable plug 40 mounted in the transverse wall 39 of the armature 22, and, thus, the armature 22, is free to slide on a crown 53 of the rod head 44.

The compression spring 48, which is preferably a first compression spring 48, forces the operating rod 43 toward armature 22 and urges the valve element 45 to a closed position on a valve seat 54, as shown in FIG. 1. A second compression spring 55, weaker than the first compression spring 48, acts on the operating rod 43 to urge the valve element 45 to an open position.

A position sensor 56 is coupled to the operating rod 43 and mounted to the housing 12. The position sensor 56 produces signals corresponding to a position of the valve element 45 of the operating rod 43. The position sensor 56 includes a sensor plunger 57 urged into operative engagement with the top of the replaceable plug 40 by the second compression spring 55.

The housing 12 includes a base 60. The base has an entrance 61 at which engine exhaust gas to be recirculated enters the base 60, a passage 62 that extends through the base 60 for conveying engine exhaust gas that has entered the entrance 61, and an exit 63 at which engine exhaust gas that has passed through the passage 62 exits the base 60. In addition to the base 60, the housing has a shell 64 connected to base 60 by, for example, fasteners as illustrated in FIG. 1. The shell 64 has a plurality of tabs 65 with landing pads 66 that fix the upper stator 25 and the lower stator 26 with the shell 64. The plurality of tabs 65 are formed by lacing portions of the shell 64 toward an interior of the shell 64.

The valve element 45 is positioned by operating rod 43. The operating rod 43 extends upwardly through a central bore in an annular shield 67 and a bore in a bushing 68. The annular shield 67 deflects the flow of contaminants which might enter vent openings 69 in housing 12 to prevent contaminants from passing into the portion of the shell 64 containing the centered solenoid assembly 18.

The coil 23 is disposed in the shell 64 of the housing 12 and rests on a wave washer 70 which allows accommodation of differential temperature expansion of coil 23 and the various other parts. The coil 23 is adapted to be energized by an electrical current caused to be directed to the coil 23 by the engine controller 71 which are connected via an electrical connector 72.

As discussed above, the armature 22, upper stator 25, and lower stator 26 form part of the centered solenoid assembly 18 that provides an electromagnetic flux path when the coil 23 is energized. The generated force of the flux path overcomes the forces acting on the floating valve mechanism 14 to cause the armature 22 and operating rod 43 to be pushed downward toward the valve seat 54 a distance proportional to the magnitude of the PWM electrical signal supplied to the coil 23. This movement unseats the valve element 43 to a controlled extent, and allows an inflow of a corresponding volume of exhaust gas into the passage 62 of the base 60.

The centered solenoid assembly 18 allows various stabilized positions of the operating rod 43, and, thus, the valve element 45. Each stabilized position corresponds to a respective percentage of a PWM electrical signal applied to the coil 23. In order to achieve the stabilized positions of the operating rod 43, the lower stator 26 has a tapered upper rim 75 which affects the magnetic flux pattern and decreases the axial force magnetically generated over distance as the armature 22 approaches the lower stator 26 so that an equilibrium is reached with the increasing spring force provided by the first compression spring 48 as the armature 22 reciprocates to move the valve element 45 to an open position.

Figure 4:
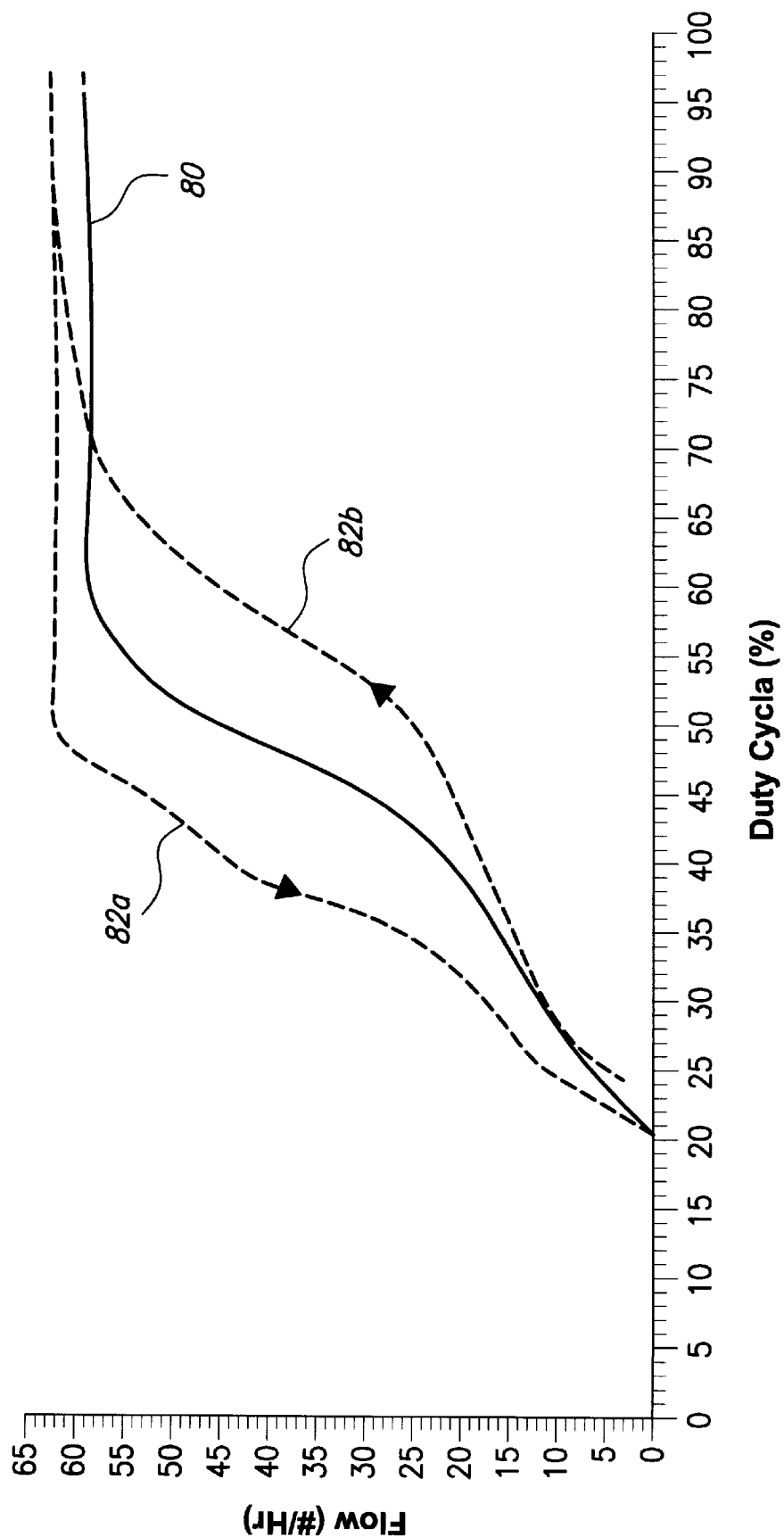
FIG. 4 is a graph illustrating the relationship between gas flow rate and percentage of PWM duty cycle for the valve assembly of the present invention with a centered solenoid assembly verse a valve assembly with a non-centered solenoid assembly.

As shown in FIG. 4 by the solid line 80 on the graph, the flow rate of exhaust gas through the base 60 of housing 12 for each of the stabilized positions is substantially the same regardless of the reciprocating direction the operating rod 43, and, thus, the valve element 45 (i.e. the operating rod 43 is moving in a valve 10 closing or valve opening direction) because of the centered solenoid assembly 16. This is in sharp contrast to the case of a valve assembly with a non-centered solenoid assembly, as illustrated by the dashed lines 82 of the graph of FIG. 4, which shows varying flow rates for a position depending on the reciprocating direction of the operating rod 43. That is, for a given percentage of PWM signal, and thus a given stabilized position, the gas rate flow in the valve closing direction, shown by line 82a, is greater than the gas flow rate in the valve opening direction, shown by dashed line 82b for a valve assembly with a non-center solenoid assembly.

Electrical signals corresponding to the position of the operating rod 43 are generated by the position sensor 56 mounted atop the housing 12. The position sensor 56 has a sensor plunger 57 loaded by the second compression spring 55 against an upper end of stem 41 of the replaceable plug 40. Movement of a sliding contact 85 linearly along conductive resistance tracks 86 creates a varying voltage drop in the manner of a potentiometer to generate electrical signals corresponding to the position of the operating rod 43. Tracks 86, which carry a baked-on conductive ink pattern forming a semi-conductor pattern to provide resistance potentiometers that are bridged by sliding contact 85, generate varying electrical signals comprised of the varying electrical potential at each position of the sensor plunger 57, and thus, operating rod 43.

These signals are transmitted back to the engine controller 71 via a series of contacts 90, connected by a suitable connector and cable (not shown), to allow the proper extent of valve opening to be achieved by a feedback circuit by generating a corresponding percentage of PWM electrical signal to be transmitted to the coil 23 via the contacts 90.

The electrical connector 72 is assembled onto the housing 12 and held firmly to the shell 64 of housing 12 with a crimped ring 92. An electrical connection is made with blade contacts 94 received in receptacle contact 96. A stainless steel cover 98 closes off the interior of the position sensor 56 to protect the same from contamination.

While a presently preferred embodiment of the invention has been illustrated and described, additional advantages and modification will readily occur to those skilled in the art. Therefore, the invention in its broader aspects is not limited to the shown and described specific details and representative devices. Accordingly, various modifications may be made without departing from the spirit or scope of the general inventive concept as defined by the appended claims and their equivalents.

We claim:

1. A valve assembly comprising:
    a housing;
    an actuator disposed within the housing, the actuator including a centered solenoid assembly with an armature that moves upon energization of a coil; and
    a floating valve mechanism operatively engaged with the solenoid assembly, the floating valve mechanism including an operating rod with a valve element, the operating rod extending toward the solenoid assembly and engaging the armature to form a single load operative connection between the centered solenoid assembly and the floating valve assembly.

2. The valve assembly of claim 1, wherein the centered solenoid assembly comprising a sleeve with a guiding surface that guides the armature, the sleeve being surrounded by a stator assembly having an operative surface disposed a fixed distance from the guiding surfaces of the sleeve to define a gap between the guiding surface of the sleeve and the operative surface of the stator assembly.

3. The valve assembly of claim 1, wherein the floating valve mechanism comprises a spring that forces the operating rod into engagement with the armature.

4. The valve assembly of claim 3, further comprising a spring retainer disposed on the operating rod proximate the rod head.

5. The valve assembly of claim 4, wherein the spring retainer comprises an annular lip that engages the compression spring so that the armature is free to slide on a crown of the rod head.

6. The valve assembly of claim 5, further comprising a replaceable plug mounted to the armature that is engaged by the rod head of the operating rod.

7. The valve assembly of claim 1, wherein the stator assembly further comprises an upper stator and a lower stator; and wherein the armature is movable within a central bore of the upper stator and a central bore of the lower stator.

8. The valve assembly of claim 7, wherein the housing comprises a shell having a plurality of tabs with landing pads that fix the upper stator and the lower stator with the shell.

9. The valve assembly of claim 7, wherein at least one of the upper stator and the lower stator comprises a central bore having the operative surface and at least one projection extending from the operative surface toward a central axis of the central bore.

10. The valve assembly of claim 9, wherein central bore of the upper stator comprises the operative surface;

wherein the operative surface comprises an undercut surface; and wherein the at least one projection comprises two projections spaced along the central axis of the bore.

11. The valve assembly of claim 10, wherein each of the two projections comprises a flat annular surface that engages the sleeve.

12. The valve assembly of claim 11, wherein the valve assembly comprises an electric exhaust gas recirculation valve.

13. A valve assembly comprising:

a housing;

a centered solenoid assembly disposed within the housing, the centered solenoid assembly including an armature that moves within a sleeve upon energization of a coil, the sleeve being surrounded by a stator assembly having an operative surface disposed a fixed distance from the sleeve to define a gap between the sleeve and the stator assembly;

an operating rod proximate the armature, the operating rod having a rod head and a valve element; and a biasing member that forces the rod head and armature into operative engagement.

14. The valve assembly of claim 13, wherein the biasing member comprises a spring that engages a spring retainer snap fitted into a groove in the operating rod proximate the rod head.

15. The valve assembly of claim 13, wherein the spring retainer comprises an annular lip that engages the first spring so that the armature is free to slide on a crown of the rod head.

16. The valve assembly of claim 15, further comprising a replaceable plug mounted in a transverse wall disposed within a central passage of the armature, the replaceable plug engaging the rod head of the operating rod.

17. The valve assembly of claim 16, wherein the spring comprises a first compression spring that forces the operating rod toward armature and urges the valve element to a closed position on a valve seat; and wherein a second compression spring, weaker than the first compression spring, acts on the operating rod to urge the valve element to an open position.

18. The valve assembly of claim 17, further comprising a position sensor coupled to the operating rod and mounted to the housing, the position sensor producing signals corresponding to a position of the valve element of the operating rod.

19. The valve assembly of claim 18, wherein the position sensor includes a plunger urged into operative engagement with the armature by the second compression spring.

20. The valve assembly of claim 19, wherein the valve assembly comprises an electric exhaust gas recirculation valve.

21. An electric exhaust gas recirculation (EEGR) valve for an internal combustion engine comprising;

a housing;

a valve mechanism disposed within the housing, the valve mechanism including an operating rod; and an actuator disposed within the housing including:
  a stator assembly having an operative surface;
  an armature including a central passage with a transverse wall that engages the operating rod; and
  a sleeve that surrounds the armature, the sleeve having a guiding surface disposed a fixed distance from the operative surface of the stator assembly to define a gap between the sleeve and the stator assembly.

22. The EEGR of claim 21, wherein the gap defines an air gap that radially balances the radial forces that act on the armature when a coil of the actuator is operated.

23. The EEGR of claim 22, wherein the transverse wall includes a plug that engages a head of the operating rod.

24. The EEGR of claim 23, wherein the housing includes a base, an entrance at which engine exhaust gas to be recalculated enters the base, a passage that extends through the base for conveying engine exhaust gas that has entered the entrance, and an exit at which engine exhaust gas that has passed through the passage exits the base.

25. The EEGR of claim 23, wherein the operating rod extends into the central passage of the armature and engages a first side of the plug.

26. The EEGR valve of claim 25, wherein a sensor shaft of a sensor extends into the central passage of the armature to engage a second side of the plug.

27. A valve assembly comprising:

a housing including a shell with a tabs with landing pads;

an actuator disposed within the housing, the actuator including an armature that moves within a stator assembly upon energization of a coil, the stator assembly including an upper stator and a lower stator that are supported within the shell by the landing pads; and a valve mechanism operatively engaged with the actuator.

28. The valve assembly of claim 27, wherein the valve mechanism comprises a floating valve mechanism including an operating rod with a valve element configured to engage a valve seat, the operating rod extending toward the solenoid assembly and engaging the armature to form a single load operative connection between the actuator and the floating valve mechanism.

29. The valve assembly of claim 27, wherein the tabs comprise lanced portions of the shell that project toward an interior of the shell.

30. The valve assembly of claim 27, wherein the armature moves within a sleeve; and wherein the sleeve is surrounded by the stator assembly, the stator assembly having an operative surface disposed a fixed distance from a guiding surfaces of the sleeve to define a gap between the guiding surface of the sleeve and the operative surface of the stator assembly.

31. A method of delivering a quantity of gas flow substantially free of operational hysteresis in an electric exhaust gas recirculation valve, comprising the steps of:

providing an armature that moves within a sleeve upon energization of a coil;

surrounding the sleeve with a stator assembly so that an operative surface of the stator assembly is a fixed distance from the sleeve;

biasing the head of an operating rod of a valve mechanism into engagement with the armature.

32. The method of claim 31, wherein the step of biasing further comprises:

engaging the operating rod of the valve mechanism at a single load connection on the armature; and supporting the operating rod with a single bushing.

33. The method of claim 32, wherein the step of engaging further comprises forcing a rod head of the operating rod with a spring into operative engagement with a replaceable plug mounted in the armature so that the replaceable plug is free to slide an a crown of the rod head.

* * * * *